United States Patent [19]

Degrassi et al.

[11] Patent Number: 4,468,427

[45] Date of Patent: Aug. 28, 1984

[54] BLENDS OF POLYAMIDE AND ETHYLENE VINYL ALCOHOL COPOLYMERS

[75] Inventors: Alfieri Degrassi, Pottsville, Pa.; William Sacks, Gillette, N.J.; John P. Sibilia, Livingston, N.J.; Abraham M. Kotliar, Westfield, N.J.; Charles D. Mason, Chatham Township, Morris County, N.J.

[73] Assignee: Allied Corporation, Morris Township, Morris County, N.J.

[21] Appl. No.: 540,984

[22] Filed: Oct. 11, 1983

Related U.S. Application Data

[62] Division of Ser. No. 319,165, Nov. 9, 1981, Pat. No. 4,427,825.

[51] Int. Cl.³ .................... B32B 27/34; B32B 27/32; C08L 29/02
[52] U.S. Cl. ................... 428/220; 428/476.1; 428/476.9; 428/475.8; 428/522; 428/523; 428/476.3
[58] Field of Search ............... 428/476.1, 476.3, 475.8, 428/476.9, 522, 523, 220; 525/56, 58

[56] References Cited

U.S. PATENT DOCUMENTS 3,636,136  1/1972  Konopih ............................. 525/58
4,347,332  8/1982  Odorzynski ........................ 525/58

FOREIGN PATENT DOCUMENTS 749125     1/1970  Belgium ............................ 525/58
45-32275  10/1970  Japan ............................... 525/58
56-08451   1/1981  Japan ............................... 525/58

Primary Examiner—Ellis P. Robinson
Attorney, Agent, or Firm—Richard A. Negin; Patrick L. Henry; Richard A. Anderson

[57] ABSTRACT

A composition of matter comprising a polyamide, preferably polyepsiloncaprolactam, and from 1 to 65 percent of an ethylene vinyl alcohol copolymer. The composition is useful for making moldings, films, and fibers.

5 Claims, No Drawings

BLENDS OF POLYAMIDE AND ETHYLENE VINYL ALCOHOL COPOLYMERS

This application is a division of application Ser. No. 319,165, filed Nov. 9, 1981 now U.S. Pat. No. 4,427,825.

DESCRIPTION

BACKGROUND OF THE INVENTION

This invention relates to polyamide and olefin/vinyl alcohol copolymer blends.

Olefin/vinyl alcohol copolymers which have a high resistance to oxygen permeability and the low water vapor transmission rate are disclosed in U.S. Pat. No. 3,585,177.

Laminates containing ethylene vinyl alcohol copolymer layers are known in the art. Layers of ethylene vinyl alcohol copolymer have been laminated adjacent to various polyolefin materials, modified polyolefin materials, polyamides, ethylene vinyl acetate copolymer, ethylene acrylic acid copolymer, and ionomers. The various laminates are designed to take advantage of the unique properties of the specific polymers contained in each laminate structure.

Of particular interest are U.S. Pat. Nos. 4,254,169, 3,595,740 and 3,949,114, all showing ethylene vinyl alcohol copolymer layers and laminates in which there is one layer of a polyamide, usually polycaprolactam, adjacent to one side of the ethylene vinyl alcohol copolymer layer.

U.S. Pat. No. 3,882,259 shows the use of ethylene vinyl alcohol copolymers blended with ethylene vinyl acetate copolymer or an ionomer. The ethylene vinyl acetate or ionomer will cause a reduction in oxygen barrier properties and generally an increase in adhesion to adjacent layers.

U.S. Pat. No. 3,636,136 disclosed compositions of polyamides having melt temperatures below 170° C. and ethylene/vinyl alcohol copolymers containing greater than 70 mole percent ethylene for use as textile fusible adhesives used in the preparation of color concentrates.

SUMMARY OF THE INVENTION

The present invention is a composition of matter comprising a polyamide and from one to 65 percent by weight of an ethylene vinyl alcohol copolymer. A preferred composition comprises polyepsiloncaprolactam and from 5 percent to 30 percent by weight of ethylene vinyl alcohol copolymer containing 15 to 65 mol percent ethylene.

The present invention includes films, laminates, fibers and molding compositions made of the composition of the present invention. A film, laminate structure of the present invention includes a layer of the composition of the present invention containing a polyamide and from 5 to 30 by weight of ethylene vinyl alcohol. A preferred laminate of the present invention includes a layer of ethylene vinyl alcohol adjacent to a layer of containing a blend of a polyamide and from 5 to 30 percent by weight of ethylene vinyl alcohol. A fiber of the present invention preferably comprises a blend of a polyamide and one to 20 percent, and preferably five to 20 percent ethylene vinyl alcohol copolymer. A molding composition of the present invention comprises a blend of a polyamide and from about 30 to about 65 percent by weight of the ethylene vinyl alcohol copolymer.

DESCRIPTION OF THE PREFERRED EMBODIMENTS

The present invention is a composition comprising a polyamide from 1 percent to 65 percent by weight of ethylene vinyl alcohol. The present invention includes films, laminates, fibers, and molding compositions made of the composition of the present invention.

Polyamides suitable for use in the present invention include the long-chain polymeric amides having reoccurring amide groups as part of the polymer backbone and preferably a number average molecular weight, as measured by membrane osmometry, of about 10,000 to 40,000. Polyamide inter-polymers comprised of a polyamide and one or more copolymers can be used. Particularly preferred are polyamide homopolymers, with polyepsiloncaprolactam, nylon 11 and 12 being most preferred. It is preferred to use polyamides having a melting temperature greater than 175° C. making them suitable for use as heat resistant fibers, films, and moldings.

Nonlimiting examples of such polyamides are: (a) those prepared by the polymerization of lactams, preferably epsilon-caprolactam; (b) those prepared by the condensation of a diamine with a dibasic acid; and (c) those prepared by self-condensation of amine acids, preferably self-condensation of 11-aminoundecanoic acid.

The aforementioned polyamides can contain various terminal functionality. Preferred are the polyepsiloncaprolactams containing, (a) a carboxyl group attached to both ends of the polymer chain, (b) a carboxyl group attached to one end and an acetamide group attached to the other end of the polymer chain, (c) an amino group attached to both ends of the polymer chain, or (d) a carboxyl group attached to one end and an amino group attached to the other end of the polymer chain.

Copolymers of ethylene and vinyl alcohol suitable for use in the present invention can be prepared by the methods disclosed in U.S. Pat. Nos. 3,510,464; 3,560,461; 2,847,845; and 3,585,177.

The ethylene vinyl alcohol copolymer can be hydrolyzed ethylene vinyl acetate copolymer. The degree of hydrolysis can range from 85 to 99.5%. The ethylene vinyl alcohol copolymer preferably contains from 15 to 65 mol percent ethylene and more preferably 25 to 50 mol percent ethylene. Copolymers of lower than 15 mol percent ethylene tend to be difficult to extrude while those above 65 mol percent ethylene have reduced oxygen barrier performance, U.S. Pat. No. 3,595,740. Additionally, it is preferred that copolymers for use as fibers have at least 20 mol percent vinyl alcohol to prevent delamination and fibrillation which occurs in fibers made of nylon and polyethylene blends.

Useful ethylene vinyl alcohol copolymers suitable for the present invention are commercially available from Kuraray of Japan. Kuraray of Japan produces an ethylene vinyl alcohol copolymer under the designation "EP-E" which has 32 to 36% ethylene, a number average molecular weight of about 29,500 and a melting point of 356° C. Other manufacturers produce suitable ethylene vinyl alcohol copolymers. One suitable copolymer has about 29% ethylene, a number average molecular weight of about number average 22,000 and a melting point of 365° C. Another described in U.S. Pat. No. 4,254,169 has 40% ethylene, a number average molecular weight of about 26,000 and a melting point of 327° F. The number average molecular weight can be measured by osmometry.

The composition of the present invention contains a polyamide, preferably polyepsiloncaprolactam and from one percent to 65 percent by weight of an ethylene vinyl alcohol copolymer. Percents by weight are based on the sum of the weight of the polyamide and the ethylene vinyl alcohol copolymer. A preferred composition of the present invention useful for making films is one that contains a polyamide, preferably polyepsiloncaprolactam and from about 5 to about 30 percent of the ethylene vinyl alcohol copolymer. A preferred composition of the present invention useful in making molding compositions is one that contains a polyamide, preferably polyepsiloncaprolactam and from about 30 percent to 65 percent of the ethylene vinyl alcohol copolymer. A preferred composition of the present invention useful in making fibers is one that contains a polyamide, preferably polyepsiloncaprolactam and from one percent to 20 percent, and more preferably from 5 percent to 20 percent of the ethylene vinyl alcohol copolymer.

When making blends of polyamides and ethylene vinyl alcohol copolymers of the present invention by melt blending, the temperature preferably is as low as possible. This is desirable since ethylene vinyl alcohol copolymers are known to be unstable in the melt phase. The ehtylene vinyl alcohol copolymer in the melt phase undergoes chemical degradation, crosslinking, and bubble formation. These conditions increase with the increase of the melt temperature and are prevalent at temperatures in the range of 240° to 250° C. which are low temperatures for processing polyepsiloncaprolactam which has a melt temperature of about 215° C. It is therefore preferred to process the polyepsiloncaprolactam and ethylene vinyl alcohol copolymers at temperatures in the range of 225° C. to 240° C. and preferably 230° C. to 240° C. to minimize the side effects of the ethylene vinyl alcohol copolymer while at the same time providing a high enough temperature to easily process the polyepsiloncaprolactam.

As indicated in the Examples, temperatures as high as 252° C. (485° F.) have been used to melt process the ethylene vinyl alcohol and polyepsiloncaprolactam copolymer blends. However in critical processes such as in the spinning of fibers it is preferred to melt process the polyepsiloncaprolactam and ethylene vinyl alcohol copolymer at lower temperatures, preferably 230° C. to 240° C.

The thermal stability conditions of ethylene vinyl alcohol copolymer in the melt, including chemical degradation, crosslinking and bubble formation result in an increase of the melt viscosity and die swell after five minutes of melt blending at 240° C. Residence time in an extruder at 240° C. for 10 minutes result in gel formation which is evidenced by rapid pressure buildups in an extruder when a filter screen is used. This suggests that lower melt processing temperature (225° C. to 240° C.) are particularly preferred for use in manufacturing environments where processing runs are likely to continue for extended lengths of time.

The composition of the present invention can be formed into film by conventional means. The film can be used alone or in a laminate. A particularly preferred laminate having oxygen barrier properties is a laminate of the composition of the present invention adjacent to a layer of ethylene vinyl alcohol copolymer. There is excellent adhesion between a layer containing a polyamide and ethylene vinyl alcohol, and a layer containing ethylene vinyl alcohol.

Laminates of the present invention can be produced in various ways. Individual layers can be formed from appropriate resins and combined in a typical laminating operation. Alternatively, depending upon the particular fabricating process employed, one or more of the layers can be preformed and the remaining layer applied by melt coating or extrusion lamination. In another method, the individual layers can be extruded through separate dies and joined in an appropriate manner while still thermoplastic.

A particularly convenient method of production and one that is preferred involves the simultaneous extrusion of the several resins as a laminate extrudate through a single dye slot which may be either in a flat dye or on an annular dye arrangement.

U.S. Pat. No. 3,560,325 discloses processing information useful in forming laminates having an ethylene vinyl alcohol layer. Generally, the composition of the present invention is thermoformable by means known to produce and process film. The film may be heat softened, then drawn, stretched and shaped by means of vacuum, application of pressure by compressed air or by other mechanical assistance to shape the sheet to the contours of the die or to a product contained within a skin pack.

Films made from the blends of polyepsiloncaprolactam and ethylene vinyl alcohol have been found to be highly transparent and have good toughness. The films have had reduced oxygen permeability compared to unmodified polyepsiloncaprolactam. These films have also been found to essentially retain the high melting point of the polyepsiloncaprolactam making them useful in high temperature applications. A preferred thickness for a film of an ethylene vinyl alcohol copolymer and polyepsiloncaprolactam blend is from about 0.5 mils (0.0005 inches) to about 5 mils. A preferred laminate is an ethylene vinyl alcohol copolymer and a polyepsiloncaprolactam blend layer of from about 0.5 mils to 5 mils adjacent to an ethylene vinyl alcohol copolymer layer of from about 0.2 mils to 1.0 mils.

In addition to making films, and film laminates, the composition of the present invention can be formed by other forming processes including injection molding. The composition of the present invention used in a molding results in increased modulus (stiffness) and improved heat resistance compared to a polyamide alone.

Compositions of the present invention containing from 80 to 99 percent by weight of polyamide and from 1 to 20 percent by weight ethylene vinyl alcohol have been spun into fibers. Fibers made of the present invention have increased modules (stiffness) allowing the use of smaller fiber diameters in applications such as carpeting. As indicated when making yarn of the composition of the present invention the polyepsiloncaprolactam and ethylene vinyl alcohol copolymer should be melt blended and spun at temperatures in the range of 225° C. to 240° C. and preferably 230° C. to 240° C.

Yarn was made of compositions of polyepsiloncaprolactam and 20 and 40 percent ethylene vinyl alcohol copolymer blended at 250° C. After a ten minute residence time in the melt the melt viscosity increased. The gel formation was apparent in that one could feel irregularities in the spun yarn.

The composition of the present invention should be melt blended to result in a blend having regions of ethylene vinyl alcohol in the polyamide which are less than 500 angstroms and preferably 20 to 100 angstroms in average diameter. This results in a composition which can be used to make clear films, moldings, and fibers which do not have inherent large molecular discontinuities.

Several examples are set forth below to illustrate the nature of the invention and the manner of carrying it out. However, the invention should not be considered as being limited to the details thereof.

EXAMPLES 1-4

Blends were made of polyepsiloncaprolactam (nylon 6) and ethylene vinyl alcohol copolymer. The nylon 6 polymer used was in pellet form and had a relative formic acid viscosity of 73 measured in 90% formic acid and a 9.2% concentration by weight. The ethylene vinyl alcohol was Kuraray type "F" (grade EP-F) produced by Kuraray of Japan. The ethylene vinyl alcohol was in pellet form and had a melt index of 1.6 grams per 10 minutes as measured on the ASTM/1238 at a load of 2160 grams. The ethylene vinyl alcohol resin contained 60 mol percent vinyl alcohol and had a glass transition temperature of 69° C. The nylon 6 pellets and ethylene vinyl alcohol pellets were mixed in a drum tumbler in relative amounts as indicated in Table 1 below. The mixture was charged to a 2-inch diameter, 24 to 1 L/D ratio, single screw extruder equipped wth a Maddox mixing type screw and a 14 inch coat hanger type flat film dye. The processing conditions were as follows: Extruder temperature: Zone 1—455° F.; Zone 2—470° F.; Zone 3 480° F.; Zone 4 500° F.; dye temperature: Zone 1—485° F.; Zone 2—475° F.; Zone 3—485° F.; adapter temperature 450° F. The screw speed was 25 revolutions per minute (rpm). The film was extruded onto a chill roll maintained at 150° F. where it was drawn to one mil (0.001 inch) in thickness then wound into a roll at a speed of 30 feet per minute.

The film was tested for oxygen permeability, using the MOCON unit and compared to film produced in virgin nylon. The MOCON cell was made by Modern Controls, Inc., Elk River, MN and operated at 25° C. The results are summarized in Table 1 below. The melting points were measured using a Differential Thermal Analysis Unit. Amounts are in weight percent of ethylene vinyl alcohol in Nylon 6 blends. The Comparatives and nylon—ethylene vinyl alcohol blends were made in 100 pound batches. In Examples 1 through 3, 90, 80 and 70 pounds of nylon and correspondingly 10, 20 and 30 pounds of ethylene vinyl alcohol copolymer (EVOH) were used.

TABLE I

| | wt % EVOH in $N_6$ | $O_2$ Permeability cc/100 in$^2$/24 hrs. 25° C. | Melting Temp. °C. |
|---|---|---|---|
| Comp 1 | 0 | 2.8 | 221 |
| Comp 2 | 100 | — | 179 |
| Ex. 1 | 10 | 1.57 | 221 |
| Ex. 2 | 20 | 0.91 | 220 |
| Ex. 3 | 30 | 0.62 | 220 |

The ethylene vinyl alcohol copolymers were found to be exceptionally miscible and compatible with the Nylon 6 polymers in amounts up to 30% by weight of the copolymer. Films made from the blends were found to be highly transparent with good toughness and reduced oxygen permeability compared to unmodified Nylon 6. The lower oxygen permeability of films produced from these blends compared to unmodified Nylon 6 films makes them very useful for packaging oxygen sensitive foods such as meats, cheeses and other dairy products.

The unexpectedly good dispersion was indicated by optical clarity and by microscopic examination. A transmission electron microscope showed that the ethylene vinyl alcohol component in the blend was present in unusually small regions of about 50 angstrom units in size or less. This is an exceptionally fine dispersion for a blend of chemically dissimilar polymers.

The films in Examples 1-3 essentially retained the high melting point of the nylon 6 making them useful in high temperature applications.

EXAMPLES 4-7

The Nylon 6 and ethylene vinyl alcohol copolymer described in Examples 1-3 were evaluated in blends for uses in injection molding compositions. Pellets of ethylene vinyl alcohol and pellets of Nylon 6 were bag blended and extruded through a 2½ inch diameter NRM extruder. The extruder conditions were Zone 1—460° F.; Zone 2 450° F.; Zone 3 450° F.; Zone 4—450° F.; flange and die 430° F. The extruder was run at 61 revolutions per minute. The extrudate was fed to a water bath and a pelletizer. The extruded pellets were molded on a Van Doren molding machine.

The compositions made are summarized in weight percent with their physical properties in Table II. The impact values were tested according to the ASTM D-256 notched Izod test. The tensile strength and elongation were tested according to ASTM D-638 and the flexural modulus was tested according to ASTM D-790. The drop weight impact was measured according to the procedure of ASTM D-2444 with the Gardener impact apparatus for measurement. The deformation temperature under load (DTUL) was measured at a load of 264 pounds per square inch in degrees Centigrade using ASTM D 648 with ¼ inch thick test specimens. The Kuraray ethylene vinyl alcohol described in Examples 1-3 is grade EP-F and is specified to have a flexural strength of 17,350 psi and flexural modulus of $5.1 \times 10^{-5}$ psi.

TABLE II

| | Comp. 3 | Ex. 4 | Ex. 5 | Ex. 6 | Comp. 4 |
|---|---|---|---|---|---|
| wt % EVOH | 0 | 20 | 40 | 60 | 100 |
| wt % $N_6$ | 100 | 80 | 60 | 40 | 0 |
| Flexural Strength (psi) | 15,000 | 15,700 | 16,200 | 17,450 | 17,990 |
| Flexural Modulus $\times 10^{-5}$ (psi) | 3.90 | 4.46 | 4.92 | 5.57 | 6.00 |
| Ultimate Tensile Strength (psi) | 11,300 | 11,070 | 11,615 | 12,000 | 12,200 |
| Ult. Elong. (%) | 137 | — | 138 | 266 | 15 |
| Yield Strength (psi) | 7,215 | 8,824 | 6,275 | 6,685 | 5,000 |
| Yield Elong. (%) | <5 | <5 | <5 | <5 | <5 |
| DTUL, 264 psi °C. | 60.1 | 56.2 | 61.2 | 60.5 | 74.8 |
| Notched Izod Impact Strength (ft-lb/in notch) | 1.11 | 0.96 | 0.78 | 0.83 | 0.87 |
| Drop. Wt. impact Strength (ft-lbs) | 200 | 146 | 77 | 37 | 29 |

An examination of the data shows a marked increase in flex strength and modulus wth high levels of ethylene vinyl alcohol. However, drop weight impact decreases. The DTUL values increased and the notched Izod impact is relatively unchanged. There is a noticeable increase in tensile elongation at 40 percent nylon, 60 percent ethylene vinyl alcohol.

EXAMPLES 7-12

The following examples illustrate the use of polyepsiloncaprolactam (nylon 6) and ethylene vinyl alcohol blends for fibers. Composition of nylon and 2,5 and 10 percent by weight of ethylene vinyl alcohol were evaluated. The ethylene vinyl alcohol was the type used and described in Examples 1 through 3. Two types of nylon were evaluated. The first was the type of nylon ($N_6$) described in Examples 1-3. The second was a polyepsiloncaprolactam having about 80 percent of the chain ends terminated with amine groups and about 20 percent of the chain ends terminated with acid groups ($N_6A$).

The nylon 6 polymers were vacuum dried at 100° C. prior to melt mixing. The compositions were melt blended in a one inch dimater extruder at an average temperature of 240° C. The extruder was operated at 40 revolutions per minute (rpm).

The melt blended samples were spun into 1000 denier yarn at 500 feet per minute using a one inch diameter extruder at an average temperature of 240° C. The extruder was operated at 40 rpm. The extruder was equipped with a metering pump and a 30 hole spinnerette having hole diameters of 0.018 inches and a length of 0.072 inches. A heated sleeve at 365° C. surrounding the extruded filament was found to be advantageous prior to air quenching.

The yarn was drawn 5.1 to 1 using a pin at 100° C. followed by a 6 inch heated block at 125° C. The take up yarn rate was 194 feet per minute. The yarn was then conditioned at 50 percent relative humidity and 23° C. and tested an Instron testing machine using a 5 inch gauge length and 100 percent extension per minute. The results are summarized in Table III. Tensile strength and tensile modulus are in grams per denier (g/d).

TABLE III

|  | Comp. 5 | Ex. 7 | Ex. 8 | Ex. 9 |
| --- | --- | --- | --- | --- |
| % EVOH | 0 | 2 | 5 | 10 |
| % $N_6A$ | 100 | 98 | 95 | 90 |
| Ult. Elong. % | 16 | 15 | 13 | 14 |
| Ult. Ten. Str. g/d | 7.8 | 7.8 | 7.2 | 7.4 |
| Tensile Mod. g/d | 49 | 49 | 53 | 58 |

|  | Comp. 6 | Ex. 10 | Ex. 11 | Ex. 12 |
| --- | --- | --- | --- | --- |
| % EVOH | 0 | 2 | 5 | 10 |
| % $N_6$ | 100 | 98 | 95 | 90 |
| Ult. Elong. % | 14 | 14 | 12 | 11 |
| Ult. Tensile Str. g/d | 8.2 | 8.3 | 8.6 | 9.0 |
| Tensile Mod. g/d | 46 | 50 | 55 | 60 |

The results of Table III indicate considerable improvement of the tensile modulus of Nylon 6 with the addition of ethylene vinyl alcohol. This indicates greater stiffness which is desirable property in various applications of fibers.

As indicated above the melt stability of ethylene vinyl alcohol copolymer is very poor. This is caused in part by a tendency for crosslinking to take place. This makes extrusion of composition containing ethylene vinyl alcohol difficult and spinning yarn particularly difficult. Therefore, in preparing the yarns for Examples 8-13 a low extrusion temperature (240° C.) and a low spinning temperature (240° C.) was used. These are considered low temperatures for processing nylon 6.

In the above Examples the compositions was melt blended prior to spinning. This is not a necessary step, particularly when using larger manufacturing type extruders. It was done in these Examples to assure uniformity of the blend.

EXAMPLES 13-18

The following illustrates the melt stability of the composition of the present invention with increasing melt temperature. The melt stability is indicated by measuring the apparent viscosity. Increases in apparent viscosity suggest crosslinking and side reactions are taking place. The apparent viscosity in kilo Pascal seconds (kPas) was measured as follows. Pellet blends of nylon 6 and ethylene vinyl alcohol were melt blended in a one inch extruder at about 240° C. The pellets were then vacuum dried at 90° C. Samples of about 8 grams were charged to an Instron ™ Rheometer fitted with a 0.06 inch (0.15 cm) diameter capillary 1.8 inches (4.57 cm) in length. The samples were given a five minute period to come to thermal equilibrium. The force required to achieve a selected volumetric throughput was monitored and the apparent viscosity determined from the force measurements. The ethylene vinyl alcohol was the type used in Example 1. The nylon 6 used in Examples 13-15, 17 and 18 was the type used in Example 1 and the nylon 6 used in Example 16 was the type used in Example 7.

The viscosity results summarized in Table IV were measured over a period of about 25 minutes with results indicated at five minute intervals.

TABLE IV

|  | 6 | EVOH | Temp °C. | 5' | 10' | 15' | 20' | 25' |
| --- | --- | --- | --- | --- | --- | --- | --- | --- |
| Comp. 7 | 100 | — | 250 | 1.4 | 1.5 | 1.7 | 2.5 | — |
| Comp. 8 | — | 100 | 250 | 1.6 | 1.9 | 1.3 | — | — |
| Ex. 13 | 80 | 20 | 250 | 1.6 | 2.5 | 2.5 | 4.4 | 5.5 |
| Ex. 14 | 60 | 40 | 250 | 2.1 | 4.4 | 7.7 | 10.0 | — |
| Ex. 15 | 20 | 80 | 250 | 1.9 | 3.3 | 5.1 | 7.9 | 8.3 |
| Comp. 9 | — | 100 | 240 | 1.6 | 1.8 | 2.0 | 2.2 | 2.1 |
| Ex. 16 | 90 | 10 | 240 | 1.3 | 1.5 | 1.6 | 1.7 | — |
| Ex. 17 | 90 | 10 | 240 | 1.8 | 2.2 | 2.7 | 3.2 | — |
| Ex. 18 | 60 | 40 | 240 | 1.9 | 2.7 | 3.6 | 5.0 | — |

These results show that for all of the Example compositions the viscosity increases with time. The Examples generally show, and sepcifically Examples 14 and 18 show, that an increase in melt temperature of only 10° C. from 240° C. to 250° C. significantly affects the melt stability.

EXAMPLES 19-22

Following are Examples of laminates which can be made and include a layer made of the composition of the present invention. (i.e., layer 1/layer 2)

Ex. 19 Composition of Ex. 1/100% EVOH
Ex. 20 Composition of Ex. 2/100% EVOH
Ex. 21 Composition of Ex. 3/100% EVOH
Ex. 22 100% EVOH/Composition Ex. 2/100% EVOH While exemplary embodiments of the invention have been described, the true scope of the invention is to be determined from the following claims.

We claim:

1. A laminate structure comprising a layer of an ethylene vinyl alcohol copolymer; and at least one adjacent layer of a heterogeneous melt blended composition consisting essentially of: a polyamide; and from 1 to 65% by weight of an ethylene vinyl alcohol copolymer having 15 to 65 mol percent ethylene, in the absence of plasticizer, wherein there are regions of ethylene vinyl alcohol copolymer having an average diameter of less than 500 angstroms in the polyamide, said composition having been processed at a temperature of from about 225° C. to 252° C. and being substantially free from crosslinking.

2. The laminate as recited in claim 1 wherein the polyamide is polyepsiloncaprolactam.

3. The laminate as recited in claim 2 wherein there is from 10 to 30 percent ethylene vinyl alcohol copolymer in the layer containing polyepsiloncaprolactam.

4. The laminate as recited in claim 1 wherein there is from 1 to 50 percent ethylene vinyl alcohol copolymer in the layer containing the polyamide.

5. A film having a thickness of from about 0.5 mils to about 5 mils made from a heterogeneous melt blended composition consisting essentially of: a polyamide; and from 1 to 65% by weight of an ethylene vinyl alcohol copolymer haing 15 to 65 mol percent ethylene, in the absence of plasticizer, wherein there are regions of ethylene vinyl alcohol copolymer having an average diameter of less than 500 angstroms in the polyamide, said composition having been processed at a temperature of from about 225° C. to 252° C. and being substantially free from crosslinking.

* * * * *